(12) United States Patent
Park

(10) Patent No.: US 11,877,609 B2
(45) Date of Patent: Jan. 23, 2024

(54) MASK WITH EPTFE MEMBRANE

(71) Applicant: Evit Global Co., Ltd., Seoul (KR)

(72) Inventor: Evit Park, Seoul (KR)

(73) Assignee: Evit Global Co., Ltd., Seoul (KR)

(*) Notice: Subject to any disclaimer, the term of this patent is extended or adjusted under 35 U.S.C. 154(b) by 328 days.

(21) Appl. No.: 17/443,214

(22) Filed: Jul. 22, 2021

(65) Prior Publication Data

US 2022/0039489 A1    Feb. 10, 2022

(30) Foreign Application Priority Data

Aug. 4, 2020 (KR) .................. 10-2020-0097325

(51) Int. Cl.

| | | |
|---|---|---|
| A41D 13/11 | (2006.01) | |
| C08L 27/18 | (2006.01) | |
| A62B 23/02 | (2006.01) | |
| A41D 31/14 | (2019.01) | |
| C08J 5/18 | (2006.01) | |

(52) U.S. Cl.
CPC ...... *A41D 13/1107* (2013.01); *A41D 13/1161* (2013.01); *A41D 31/145* (2019.02); *A62B 23/025* (2013.01); *C08J 5/18* (2013.01); *C08L 27/18* (2013.01)

(58) Field of Classification Search
CPC ............................ A62B 23/025; A41D 13/11
See application file for complete search history.

(56) References Cited

U.S. PATENT DOCUMENTS

| | | | | |
|---|---|---|---|---|
| 8,147,583 | B2 * | 4/2012 | Gebert | B01D 39/1692 |
| | | | | 55/497 |
| 9,543,255 | B2 * | 1/2017 | Lamorey | H01L 23/49866 |
| 2006/0130214 | A1 * | 6/2006 | Steindorf | A41D 13/1115 |
| | | | | 128/206.13 |
| 2006/0130841 | A1 * | 6/2006 | Spence | A41D 13/1107 |
| | | | | 128/206.19 |
| 2007/0190166 | A1 * | 8/2007 | Howard | A62D 5/00 |
| | | | | 424/538 |
| 2008/0146109 | A1 * | 6/2008 | Howard | D04H 1/43835 |
| | | | | 424/484 |
| 2008/0289088 | A1 * | 11/2008 | Howard, Jr. | B32B 27/12 |
| | | | | 2/457 |
| 2009/0300832 | A1 * | 12/2009 | Howard, Jr. | B32B 5/26 |
| | | | | 428/221 |
| 2009/0304759 | A1 * | 12/2009 | Howard, Jr. | A41D 31/305 |
| | | | | 428/221 |
| 2010/0223716 | A1 * | 9/2010 | Howard, Jr. | B32B 9/047 |
| | | | | 2/457 |
| 2010/0273383 | A1 * | 10/2010 | Barney | B32B 5/024 |
| | | | | 442/181 |

(Continued)

*Primary Examiner* — Khaled Annis
(74) *Attorney, Agent, or Firm* — AVEK IP, LLC

(57) ABSTRACT

Disclosed herein is a mask with an ePTFE membrane including: a mask sheet for covering a wearer's nose and mouth; and a mask string which is connected to both ends of the mask sheet and is held to the wearer's ears, wherein the mask sheet includes an ePTFE membrane. The mask sheet includes: an inner layer located toward the wearer's face; an outer layer located on the opposite side of the inner layer which faces the wearer's face; and the ePTFE membrane located between the inner layer and the outer layer. Furthermore, both ends of the outer layer, both ends of the ePTFE membrane and both ends of the inner layer are bonded mutually.

20 Claims, 3 Drawing Sheets

(56) References Cited

U.S. PATENT DOCUMENTS

| | | | | |
|---|---|---|---|---|
| 2013/0052116 | A1* | 2/2013 | Barney | B32B 9/045 |
| | | | | 423/331 |
| 2016/0015098 | A1* | 1/2016 | Conlon | A41D 13/1115 |
| | | | | 29/428 |
| 2019/0069611 | A1* | 3/2019 | Potnis | A41D 13/0056 |
| 2019/0208843 | A1* | 7/2019 | Zhu | A41D 13/11 |
| 2021/0206144 | A1* | 7/2021 | Ewell | B32B 7/09 |
| 2021/0299489 | A1* | 9/2021 | Semerly | A61M 21/02 |
| 2021/0379518 | A1* | 12/2021 | Poon | B01D 46/0032 |
| 2021/0386140 | A1* | 12/2021 | Brown | A62B 23/02 |
| 2021/0402221 | A1* | 12/2021 | Xia | A62B 9/003 |
| 2022/0039489 | A1* | 2/2022 | Park | A41D 31/145 |
| 2022/0110383 | A1* | 4/2022 | Lee | B01D 39/08 |
| 2022/0132948 | A1* | 5/2022 | Kasiri | D01F 1/10 |
| | | | | 128/863 |
| 2022/0219105 | A1* | 7/2022 | Lord | B01D 39/1623 |
| 2022/0296766 | A1* | 9/2022 | Lee | A62B 23/02 |
| 2022/0347609 | A1* | 11/2022 | Lee | B01D 39/1623 |
| 2022/0408862 | A1* | 12/2022 | Kuo | A62B 23/025 |
| 2023/0039345 | A1* | 2/2023 | Lin | A62B 23/025 |
| 2023/0129150 | A1* | 4/2023 | Nyitray | A61L 9/014 |
| | | | | 128/863 |
| 2023/0135994 | A1* | 5/2023 | Secours | B01D 39/083 |
| | | | | 128/863 |

* cited by examiner

| Classification | Present invention | 3M N95 mask | General MB filter mask | Dental mask |
|---|---|---|---|---|
| Filter | ePTFE filter | Multilayer electrostatic MB filter | MB filter (KF 94) | Spun-bonded filter |
| Filtration efficiency | 99.9% | 95% | 94% | 50-80% |
| Breathability | Excellent | Discomfort | Discomfort | Excellent |
| Ultra-fine particulate matter protection (based on PM 2.5) | Excellent | Excellent | Poor | Poor |
| Dust/pollen protection | Excellent | Excellent | Normal | Poor |
| Oil/alcohol protection | Excellent | Poor | Poor | Poor |
| Microbiological protection | Excellent | Excellent | Normal | Poor |

FIG. 3

MASK WITH EPTFE MEMBRANE

CROSS-REFERENCE TO RELATED APPLICATIONS

This application claims the benefit of priority of KR Application No. 10-2020-0097325, filed Aug. 4, 2020, the entire disclosure of which is incorporated by reference in its entirety.

FIELD OF THE INVENTION

The present invention relates to a mask with an ePTFE membrane, and more particularly, to a mask with an ePTFE membrane which can increase breathability and maximize filtration efficiency.

BACKGROUND ART

As Covid 19 spreads rampantly, a demand for masks increases rapidly. In general, masks with meltblown filters (MB filters) are frequently used.

The meltblown filter is a nonwoven filter made by extrusion spinning through a nozzle after melting thermoplastic polymers such as polypropylene (PP). The meltblown filter is a material widely used for industrial use and medical use, and is the key filter material used as an internal filter for medical and health-care masks distributed in markets as well as KF masks. A meltblown method means a melt spinning method of pulling out melt polypropylene material in a thread form through a nozzle having a tiny hole. The polypropylene pulled out in the thread form is conveyed along a conveyer belt, passes between two rollers, and then, is pressed into a nonwoven fabric form.

The meltblown filter has a cobweb structure through a mutual coupling of fine fibers of less than 10 µm in diameter. So, it is difficult for fine foreign matters to pass through since fibrous tissues get tangled and piled up randomly. After that, when static electricity is provided through a postprocess, the meltblown filter becomes an electrostatic filter which can pick out ultra-fine particulate matters. However, because the meltblown filter is deteriorated in electrostatic effect and in antivirus effect when vapor generated during breathing touches non-woven fabric as much as the filter adsorbs foreign matters by static electricity, a user cannot reuse the mask repeatably. Moreover, the meltblown filter is not good at breathability due to the structure.

So, studies on a mask which is cheaper than such meltblown filter masks, has long-term use time, and is good at breathability, filtration efficiency and antivirus capability are ongoing. However, there is not such a mask with satisfactory outcomes yet.

SUMMARY OF THE INVENTION

Accordingly, the present invention has been made to solve the above-mentioned problems occurring in the prior arts, and it is an object of the present invention to provide a mask with an ePTFE membrane which can increase breathability, maximize filtration efficiency, block fine particulate matters, and protect a user against viruses.

Objects to be achieved by the mask with the ePTFE membrane according to the present invention are not limited to the objects described above, and other objects that are not described will be clearly understood by a person skilled in the art from the description below.

To accomplish the above object, according to the present invention, there is provided a mask with an ePTFE membrane including: a mask sheet for covering a wearer's nose and mouth; and a mask string which is connected to both ends of the mask sheet and is held to the wearer's ears, wherein the mask sheet may include an ePTFE membrane.

Moreover, the mask sheet may include: an inner layer located toward the wearer's face; an outer layer located on the opposite side of the inner layer which faces the wearer's face; and the ePTFE membrane located between the inner layer and the outer layer. Furthermore, both ends of the outer layer, both ends of the ePTFE membrane and both ends of the inner layer may be bonded mutually.

Here, the inner layer may include: a PP inner layer located toward the wearer's face; and a PET inner layer located between the ePTFE membrane and the PP inner layer. The outer layer may include: a PET outer layer located on the ePTFE membrane; and a PP outer layer located on the PET outer layer.

In another aspect of the present invention, a mask sheet used for a mask may include an ePTFE membrane.

According to another embodiment of the present invention, the mask sheet used for a mask may include: an inner layer; an ePTFE membrane located on the inner layer; and an outer layer located on the ePTFE membrane.

Here, the inner layer may include: a PET inner layer located on the ePTFE membrane; and a PP inner layer located on the PET inner layer. The outer layer may include: a PET outer layer located on the ePTFE membrane; and a PP outer layer located on the PET outer layer. Both ends of the outer layer, both ends of the ePTFE membrane and both ends of the inner layer may be bonded mutually.

According to preferred embodiments of the present invention, the mask with the ePTFE membrane has the following effects.

(1) The mask with the ePTFE membrane according to the present invention can have excellent breathability and filtration efficiency to 99.9% or more.

(2) The mask with the ePTFE membrane according to the present invention can provide excellent protective power against ultra-fine particulate matters, dust, pollens, oil, alcohol, bacteria, viruses and others.

(3) The ePTFE membrane of the mask according to the present invention can provide excellent protective power against Covid 19 which has been known as viruses spreading by water droplets in the air by forming ideal media to block a passage of water droplets.

(4) The ePTFE membrane of the mask according to the present invention can be harmless to the human not to occur side effects due to long-period use.

(5) The hydrophobicity of the ePTFE membrane of the mask according to the present invention can immediately eliminate water droplets infected from the surface of the ePTFE membrane.

(6) The ePTFE membrane of the mask according to the present invention can have excellent protective power against hot water and alcohol to maintain its performance even though it is used for one week.

However, the effects to be achieved by the mask with the ePTFE membrane according to a preferred embodiment of the present invention are not limited to the above-mentioned effects and further effects not described above will be clearly understood by those skilled in the art.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 3 is a table showing performance comparison results of the mask according to the preferred embodiment of the present invention, a 3M N95 mask, a general MB filter mask, and a dental mask.

DETAILED DESCRIPTION OF THE PREFERRED EMBODIMENT

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure.

In addition, in the description, details of well-known features and techniques may be omitted to avoid unnecessarily obscuring the presented embodiments.

It will be understood that when an element is referred to as being "connected" or "coupled" to another element, it can be directly connected or coupled to the other element, but unless otherwise defined herein, it can be connected or coupled to another component through a further component.

Furthermore, it will be also understood that each of the components to be described below may additionally perform some or all of the functions of other components in addition to the main functions of the components, and some of the main functions of each of the components may be carried out exclusively by other components.

Hereinafter, preferred embodiments according to the technical idea of the present invention will be described in detail in order.

Figure 1:
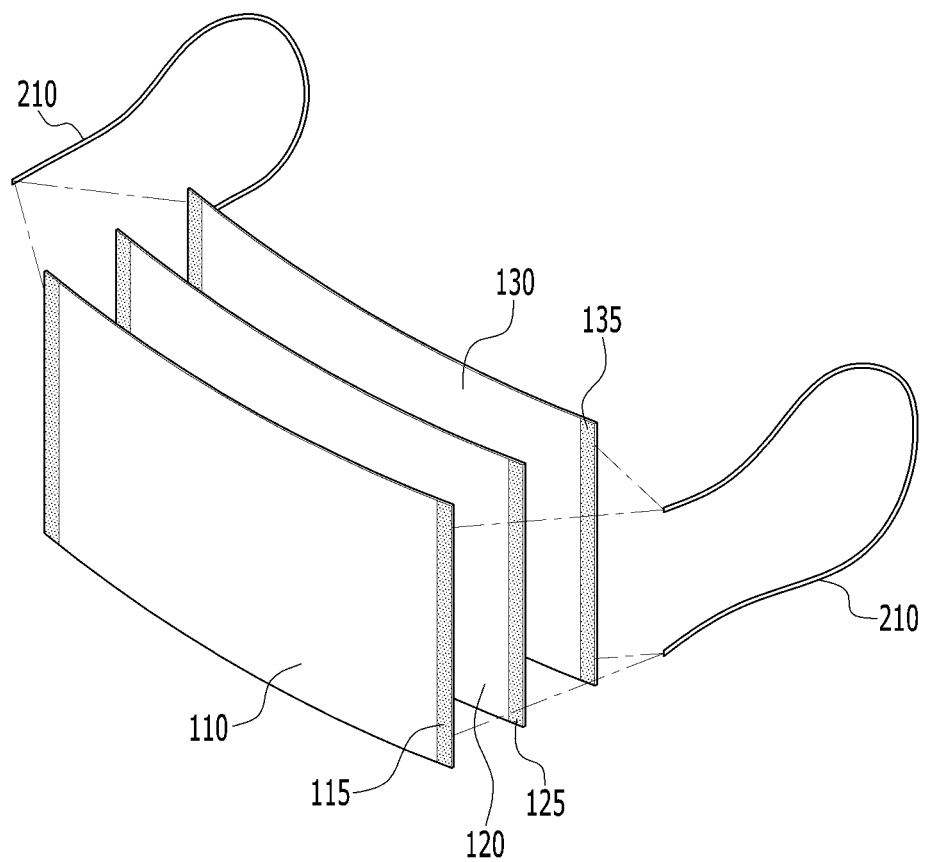
FIG. 1 is a view schematically showing a mask with an ePTFE membrane according to a preferred embodiment of the present invention.
Figure 2:
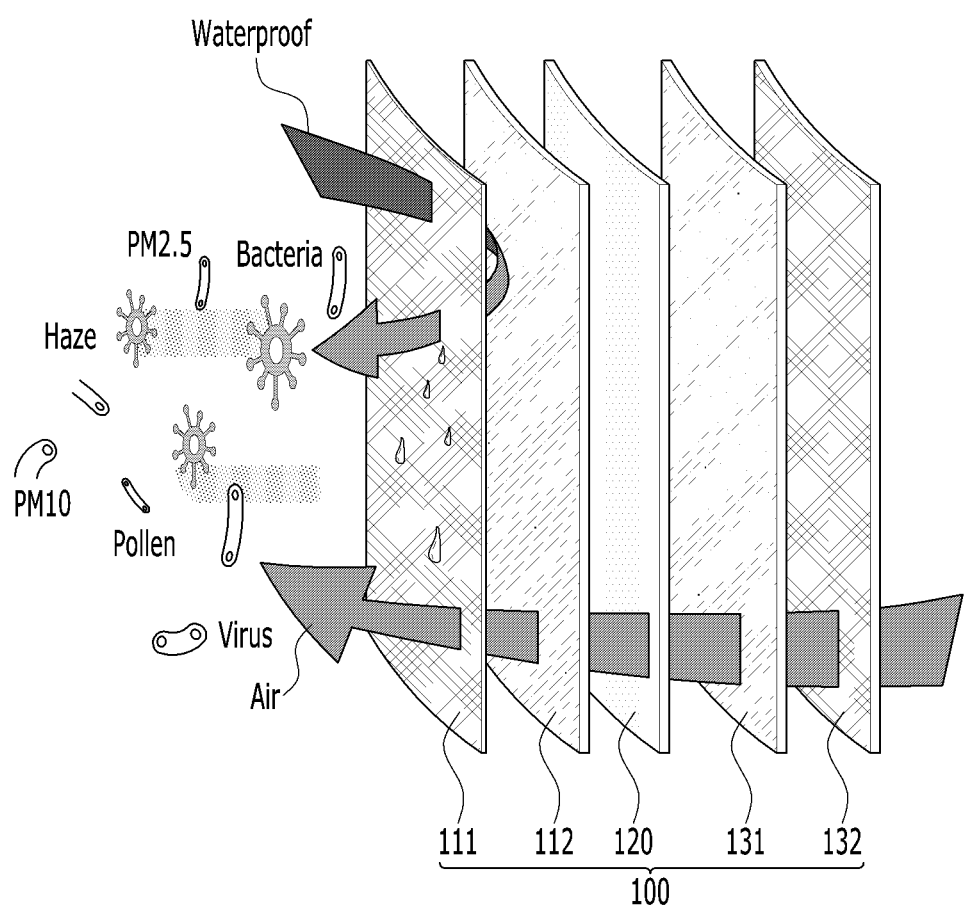
FIG. 2 is a view schematically showing a mask sheet of the mask with the ePTFE membrane according to the preferred embodiment of the present invention.

FIG. 1 is a view schematically showing a mask with an ePTFE membrane according to a preferred embodiment of the present invention, and FIG. 2 is a view schematically showing a mask sheet of the mask with the ePTFE membrane according to the preferred embodiment of the present invention.

The mask with the ePTFE membrane according to the preferred embodiment of the present invention may include a mask sheet 100, and a mask string 210.

The mask sheet 100 is a member to cover a wearer's nose and mouth, and the mask string 210 is a member to be connected to both ends of the mask sheet and to be held to the wearer's ears.

The mask sheet 100 may have a structure that an outer layer 110, an ePTFE membrane 120 and an inner layer 130 are stacked in order. That is, the inner layer 130 may be located toward the wearer's face, the outer layer 110 may be located on the opposite side of the inner layer which faces the wearer's face, and the ePTFE membrane 120 may be located between the inner layer 130 and the outer layer 110.

ePTFE is an abbreviation of expanded polytetrafluoroethylene. The unique microporous structure of the ePTFE membrane may block infiltration of liquid or pollutant particles and have good breathability. The ePTFE membrane is a very thin membrane, may allow air to pass well between the outer layer 110 and the inner layer 130, and may perfectly block ultra-fine particulate matters, dust, pollens, oil, alcohol, bacteria, viruses and others.

Both ends 115 of the outer layer 110, both ends 125 of the ePTFE membrane 120 and both ends 135 of the inner layer 130 may be bonded mutually in the state where the outer layer 110, the ePTFE membrane 120 and the inner layer 130 are stacked, so that the outer layer 110, the ePTFE membrane 120 and the inner layer 130 can keep the coupled state without separation. The mask string 210 may be boned and fixed on the bonded ends 115, 125 and 135.

The inner layer 130 may include a polyethylene terephthalate (PET) inner layer 131 and a polypropylene (PP) inner layer 132. The PP inner layer 132 is a sheet containing polypropylene or made of polypropylene, and may be located toward the wearer's face. The PET inner layer 131 is a sheet containing polyethylene terephthalate or made of polyethylene terephthalate, and may be located between the ePTFE membrane 120 and the PP inner layer 132. However, the stacking order of the PP inner layer 132 and the PET inner layer 131 may be reversed.

The outer layer 110 may include a PP outer layer 111 and a PET outer layer 112. The PET outer layer 112 is a sheet containing polyethylene terephthalate or made of polyethylene terephthalate, and may be located on the ePTFE membrane 120. The PP outer layer 111 is a sheet containing polypropylene or made of polypropylene, and may be located on the PET outer layer 112. However, the stacking order of the PP outer layer 111 and the PET outer layer 1112 may be reversed.

Here, it is illustrated that the inner layer 130 and the outer layer 110 include sheets of polypropylene and sheets of polyethylene terephthalate, but the material and the number of the sheets are not limited to the above, and sheets of various materials to achieve similar functions may be used. Each of the inner layer 130 and the outer layer 110 may have just one sheet. Additionally, the inner layer 130 may be omitted.

FIG. 3 is a table showing performance comparison results of the mask according to the preferred embodiment of the present invention, a 3M N95 mask, a general MB filter mask, and a dental mask. In FIG. 3, it is confirmed that the mask according to the preferred embodiment by the technical idea of the present invention shows more excellent performance in all items than other masks.

A HEPA filter is a high-performance filter that can filter out most of the fine particles. The HEPA filter can filter more than 99.97% of 0.3 μm particles in the air, so it is used in clean rooms, medical laboratories and so on. HEPA is an acronym for 'High Efficiency Particulate Air', and the HEPA filter refers to a high-performance filter that can filter out most of the extremely fine particles. The size of the droplet is about 0.5 μm, and the HEPA filter can filter more than 99.97% of particles with a size of 0.3 μm (micrometer) in the air. Therefore, it is known that it functions like a mask for prevention.

The HEPA filters were first developed to purify radioactive particles in the air when nuclear research began. Since then, it has been used not only in facilities handling radioactive materials, but also in clean rooms, medical laboratories, negative pressure rooms and so on. The air purifier also has a built-in HEPA filter made of melt blown (MB) material.

Meanwhile, in Korea, the Central Disaster and Safety Countermeasures Headquarters has issued an operating guideline for COVID-19 screening clinics to install a HEPA filter when operating the air conditioner.

The description of the present invention sets forth the best mode of the invention, and is provided to illustrate the invention and to enable those skilled in the art to make and use the invention. The written description is not intended to limit the invention to the specific terms presented.

Therefore, while the present invention has been described in detail with reference to the above examples, those skilled in the art will be able to make changes, modifications, and variations on these embodiments without departing from the scope of the present invention. In other words, in order to achieve the intended effects of the present invention, it is not necessary to separately include all the functional blocks shown in the drawings or all the steps shown in the drawings are not necessarily followed in the order shown, or otherwise, they can belong to the technical scope of the present invention described in claims.

What is claimed is:

1. A mask with an expanded polytetrafluorethylene (ePTFE) membrane, the mask comprising:
   a mask sheet for covering a wearer's nose and mouth, the mask sheet comprising:
      an inner layer group located toward the wearer's face, the inner layer group having a first inner layer and a second inner layer;
      an outer layer group located on an opposite side of mask sheet, the outer layer group having a first outer layer and a second outer layer; and
      an ePTFE membrane located between the inner layer group and the outer layer group; and
   a mask string which is connected to both ends of the mask sheet and is held to the wearer's ears,
   wherein each of the first inner layer, the second inner layer, the first outer layer, and the second outer layer of the mask sheet are formed from a material selected from the group consisting of: polypropylene (PP) and polyethylene terephthalate (PET).

2. The mask according to claim 1, wherein both ends of the outer layer group, both ends of the ePTFE membrane and both ends of the inner layer group are bonded mutually.

3. The mask according to claim 1, wherein the inner layer group comprises:
   a PP inner layer located toward the wearer's face; and
   a PET inner layer located between the ePTFE membrane and the PP inner layer.

4. The mask according to claim 1, wherein the outer layer group comprises:
   a PET outer layer located on the ePTFE membrane; and
   a PP outer layer located on the PET outer layer.

5. A mask sheet used for a face mask; the mask sheet comprising:
   a first layer grouping located on a side of the mask sheet proximate a wearer's face, the first layer grouping comprising at least a first layer having a central portion and an edge portion, and a second layer having a central portion and an edge portion;
   an ePTFE membrane having a central portion and an edge portion; and
   a second layer grouping located on a side of the mask sheet opposite a wearer's face, the second layer grouping comprising at least a third layer having a central portion and an edge portion, and a fourth layer having a central portion and an edge portion;
   wherein:
      the ePTFE membrane is disposed between the first layer grouping and the second layer grouping;
      the edge portions of the first layer, the second layer, the ePTFE membrane, the third layer, and the fourth layer are mutually bonded; and
      the first layer, the second layer, the third layer, and the fourth layer are each independently formed from a material selected from the group consisting of: polypropylene (PP) and polyethylene terephthalate (PET).

6. The mask sheet according to claim 5, wherein the first and second layers are formed from dissimilar materials.

7. The mask sheet according to claim 6, wherein the third and fourth layers are formed from dissimilar materials.

8. The mask sheet according to claim 5, wherein the first layer and the fourth layer are formed from the same material, and the second layer and the third layer are formed from the same material.

9. The mask sheet according to claim 5, wherein:
   the first layer is formed from PP;
   the second layer is formed from PET;
   the third layer is formed from PP; and
   the fourth layer is formed from PET.

10. The mask sheet according to claim 5, wherein:
    the first layer is formed from PP;
    the second layer is formed from PP;
    the third layer is formed from PP; and
    the fourth layer is formed from PET.

11. The mask sheet according to claim 5, wherein:
    the first layer is formed from PET;
    the second layer is formed from PET;
    the third layer is formed from PP; and
    the fourth layer is formed from PET.

12. The mask sheet according to claim 5, wherein:
    the first layer is formed from PET;
    the second layer is formed from PP;
    the third layer is formed from PP; and
    the fourth layer is formed from PET.

13. The mask sheet according to claim 5, wherein:
    the first layer is formed from PP;
    the second layer is formed from PET;
    the third layer is formed from PP; and
    the fourth layer is formed from PP.

14. The mask sheet according to claim 5, wherein:
    the first layer is formed from PET;
    the second layer is formed from PP;
    the third layer is formed from PP; and
    the fourth layer is formed from PP.

15. The mask sheet according to claim 5, wherein:
    the first layer is formed from PP;
    the second layer is formed from PET;
    the third layer is formed from PET; and
    the fourth layer is formed from PET.

16. The mask sheet according to claim 5, wherein:
    the first layer is formed from PET;
    the second layer is formed from PP;
    the third layer is formed from PET; and
    the fourth layer is formed from PET.

17. The mask sheet according to claim 5, wherein:
    the first layer is formed from PP;
    the second layer is formed from PP;
    the third layer is formed from PET; and
    the fourth layer is formed from PP.

18. The mask sheet according to claim 5, wherein:
    the first layer is formed from PET;
    the second layer is formed from PET;
    the third layer is formed from PET; and
    the fourth layer is formed from PP.

19. The mask sheet according to claim 5, wherein:
the first layer is formed from PP;
the second layer is formed from PET;
the third layer is formed from PP; and
the fourth layer is formed from PP.

20. A face mask for covering a wearer's nose and mouth, the mask comprising:
- a mask sheet comprising:
  - a first substantially rectangular layer having a first side facing toward a wearer's face and a second side facing away from the wearer's face, each side of the first layer having a central area, a first edge portion, and a second edge portion, the first layer being formed from polypropylene (PP);
  - a second substantially rectangular layer having a first side adjacent to and facing toward the second side of the first layer and a second side facing away from the first layer, each side of the second layer having a central area, a first edge portion, and a second edge portion, the second layer being formed from polyethylene terephthalate (PET);
  - a substantially rectangular membrane having a first side adjacent to and facing toward the second side of the second layer and a second side facing away from the second layer, each side of the membrane having a central area, a first edge portion, and a second edge portion, the membrane being formed from expanded polytetrafluorethylene (ePTFE);
  - a third substantially rectangular layer having a first side adjacent to and facing toward the second side of the membrane and a second side facing away from the membrane, each side of the third layer having a central area, a first edge portion, and a second edge portion, the second layer being formed from PET; and
  - a fourth substantially rectangular layer having a first side adjacent to and facing toward the second side of the third layer and a second side facing away from the third layer and being exposed to an exterior surface of the mask sheet, each side of the fourth layer having a central area, a first edge portion, and a second edge portion, the second layer being formed from PP;
- a first mask string configured to extend around the wearer's ears, the first mask string being connected to the mask sheet along a first edge portion of the mask sheet; and
- a second mask string configured to extend around the wearer's ears, the second mask string being connected to the mask sheet along a second edge portion of the mask sheet;

wherein:
- the first edge portion of the first layer, the first edge portion of the second layer, the first edge portion of the membrane, the first edge portion of the third layer, and the first edge portion of the fourth layer are mutually bonded to form the first edge portion of the mask sheet; and
- the second edge portion of the first layer, the second edge portion of the second layer, the second edge portion of the membrane, the second edge portion of the third layer, and the second edge portion of the fourth layer are mutually bonded to form the second edge portion of the mask sheet.

* * * * *